(12) United States Patent
Nakano

(10) Patent No.: US 10,819,875 B2
(45) Date of Patent: Oct. 27, 2020

(54) IMAGE READING APPARATUS

(71) Applicant: BROTHER KOGYO KABUSHIKI KAISHA, Nagoya-shi, Aichi-ken (JP)

(72) Inventor: Katsuya Nakano, Tokoname (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 16/787,173

(22) Filed: Feb. 11, 2020

(65) Prior Publication Data

US 2020/0280648 A1 Sep. 3, 2020

(30) Foreign Application Priority Data

Feb. 28, 2019 (JP) ................. 2019-036149

(51) Int. Cl.
*H04N 1/04* (2006.01)
*H04N 1/12* (2006.01)
*H04N 1/00* (2006.01)

(52) U.S. Cl.
CPC ......... *H04N 1/121* (2013.01); *H04N 1/00596* (2013.01); *H04N 1/00602* (2013.01); *H04N 1/00737* (2013.01)

(58) Field of Classification Search
CPC ............... H04N 1/121; H04N 1/00596; H04N 1/00602; H04N 1/00737
USPC ................................. 358/496, 498
See application file for complete search history.

(56) References Cited

U.S. PATENT DOCUMENTS

| | | | |
|---|---|---|---|
| 9,141,876 B1* | 9/2015 | Jones | G06K 9/60 |
| 2015/0256697 A1 | 9/2015 | Kosaka et al. | |
| 2017/0098134 A1* | 4/2017 | Jones | G07D 11/50 |

FOREIGN PATENT DOCUMENTS

JP 2015-170968 A 9/2015

* cited by examiner

*Primary Examiner* — Cheukfan Lee
(74) *Attorney, Agent, or Firm* — Scully, Scott, Murphy & Presser, PC

(57) ABSTRACT

An image reading apparatus includes: a document insertion port which allows documents to be inserted thereinto in a state of being arranged in a main scanning direction; a conveyor which conveys the documents inserted into the document insertion port in a predetermined conveyance direction; a scanner which reads images of the documents conveyed by the conveyor; a detector which detects whether at least one of the documents is present in the document insertion port; and a controller which counts a conveyance amount by which the documents are conveyed by the conveyor during a period in which the detector continuously detects that the at least one of the documents is present in the document insertion part. In a case that the images read by the scanner include a set of images croppable as an image of a single document included in the documents, the controller corrects the conveyance amount.

5 Claims, 6 Drawing Sheets

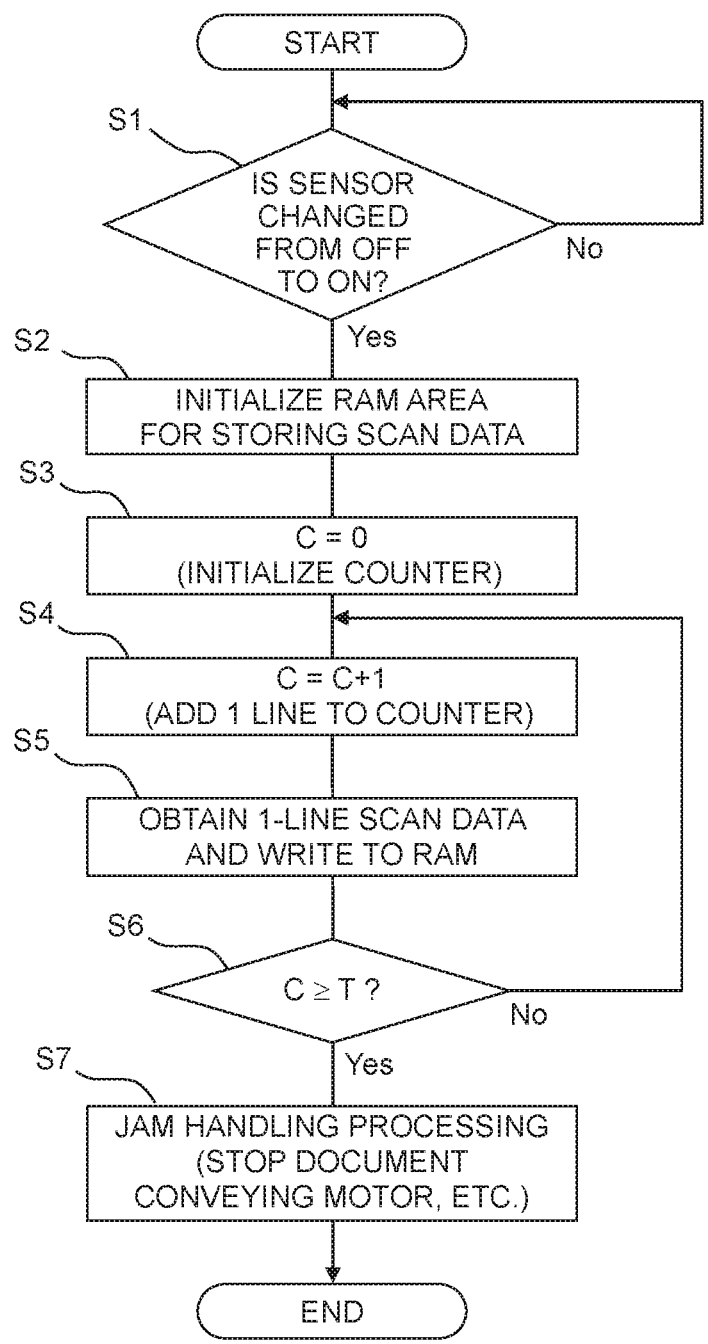

IMAGE READING APPARATUS

CROSS REFERENCE TO RELATED APPLICATION

The present application claims priority from Japanese Patent Application No. 2019-036149 filed on Feb. 28, 2019, the disclosure of which is incorporated herein by reference in its entirety.

BACKGROUND

Field of the Invention

The present disclosure relates to an image reading apparatus which reads an image of a document.

Description of the Related Art

There is proposed an image reading apparatus provided with a document insertion port into which a document is inserted. This image reading apparatus reads an image of the document via a reading part while conveying the document, which is inserted into the document insertion port, by a conveying part. Further, in the image recording apparatus of this type, it is conceivable to configure the document insertion port such that a plurality of documents are insertable thereinto in a state that the plurality of documents are arranged in a main scanning direction (i.e., by arranging the documents such that the documents overlap with each other in the main scanning direction at least partially). In such a case, it is possible to read images corresponding to the documents which are arranged in the main scanning direction and a sub-scanning direction, as a series of images.

SUMMARY

In the above-described image reading apparatus, it is possible to estimate, as a length of a document, a conveyance amount by which the document is conveyed by the conveying part while a detecting part such as a sensor continuously detects that the document is present in the document insertion port. In this situation, documents are inserted into the document insertion port in a state that the documents overlap with each other in the main scanning direction at least partially. Accordingly, in a case that the documents which are arranged in the main scanning direction and sub-scanning direction are read as a series of images, the length of the documents estimated by the above-described method is long.

On the other hand, in the image reading apparatus, in a case that an estimated value of the length of the document exceeds a predetermined threshold value, it is possible to conceive that any conveyance error of document is occurred and to execute any error handling processing such as a jam handling processing. In such a case, if the length of the documents is estimated by the above-described method, there is such a possibility that the error handling processing might be executed despite that any conveyance error has not occurred.

Thus, an object of the present disclosure is to provide an image reading apparatus capable of appropriately estimating the conveyance amount of a single document (namely, the length of the single document) even in a case that a plurality of documents are arranged side by side in the main scanning direction and inserted into the document insertion port.

According to an aspect of the present disclosure, there is provided an image reading apparatus including: a document insertion port configured to allow a plurality of documents to be inserted thereinto in a state that the documents are arranged side by side in a main scanning direction; a conveyor configured to convey the documents inserted into the document insertion port in a predetermined conveyance direction while drawing the documents into the document insertion port; a scanner configured to read a plurality of images of the documents conveyed by the conveyor; a detector configured to detect whether at least one of the documents is present in the document insertion port; and a controller configured to count a conveyance amount by which the documents are conveyed by the conveyor during a period in which the detector continuously detects that the at least one of the documents is present in the document insertion port, wherein in a case that the images read by the scanner include a set of images croppable as an image of a single document included in the documents, the controller is configured to correct the conveyance amount by subtracting a value corresponding to a length in the conveyance direction of the set of images from the conveyance amount. Note that the phrase "continuously detect(s)" may also encompass such a case that a state of non-detection is momentarily provided due to, for example, effect of vibration, etc.

According to such a configuration, even in a case that the plurality of documents are inserted into the document insertion port and that a set of images croppable as an image according to a single document is included in the images read by the scanner, the conveyance amount is corrected by subtracting the value, corresponding to the length in the conveyance direction of the set of images, from the counted conveyance amount during a period in which the detector continuously detects the presence of at least one of the documents. Accordingly, even in a case that the documents are inserted into the document insertion port, it is possible to suppress such a situation that the length of the documents is counted to be abnormally long.

BRIEF DESCRIPTION OF THE DRAWINGS

FIG. 3 is a flowchart of a counting processing executed by the control system.

DESCRIPTION OF THE EMBODIMENTS

Figure 1:
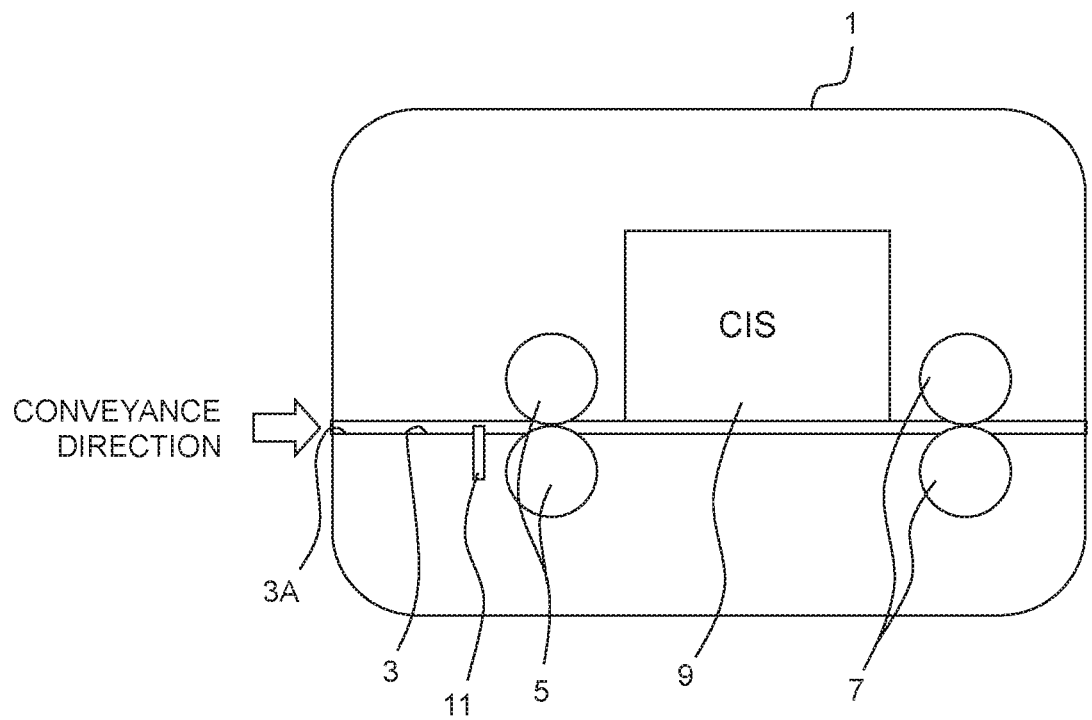
FIG. 1 is a schematic view depicting the configuration of an image reading apparatus of an embodiment.

In the following, an embodiment of the present disclosure will be explained, while referring to the drawings.

<Configuration>

An image reading apparatus 1 of the present embodiment is provided with a document conveyance path 3 penetrating through the image reading apparatus linearly (namely, having a thin or slim rectangular-parallelepiped shape). The document conveyance path 3 is provided with a pair of conveying rollers 5 on an upstream side part thereof and a pair of conveying rollers 7 on a downstream part thereof. The document conveyance path 3 and the conveying rollers 5 and 7 are an example of a "conveyor". Further, a CIS (Contact Image Sensor: a tight-contact image sensor) 9 is provided on a part or portion of the document conveyance path 3 which is located between the conveying rollers 5 and the conveying rollers 7. Note that the CIS 9 is a one-dimensional image sensor including a plurality of reading elements arranged in an orthogonal direction (namely, a main scanning direction) orthogonal to a conveyance direction in which a document (original, original document or manuscript) G is conveyed by the conveying rollers 5 and the conveying rollers 7 (namely, a sub-scanning direction). The CIS is an example of a "scanner".

Further, a document detecting sensor 11 which detects a document G (see FIG. 5) inserted from the document insertion port 3A as an upstream-side end of the document conveyance path 3 is provided on an upstream part of the document conveyance path 3. The document detecting sensor 11 is an example of a "detector". Note that the document insertion port 3A has, for example, a width (namely, a length in the main scanning direction) which allows, for example, a plurality of documents G such as business cards, etc., to be arranged in the main scanning direction (namely, arranged so that positions in the sub-scanning direction between the plurality of documents G are matched at least partially) and to be insertable into the document insertion port 3A.

Figure 2:
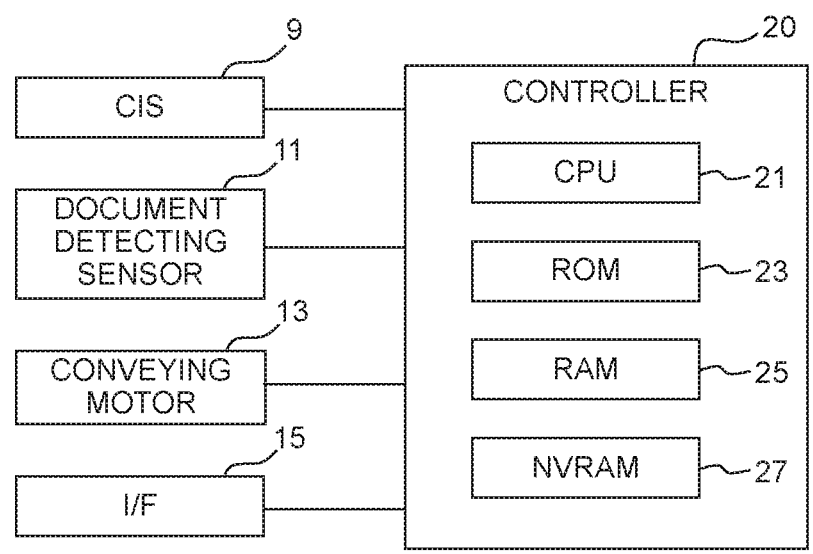
FIG. 2 is a block diagram depicting the configuration of a control system of the image reading apparatus of the embodiment.
Figure 4A:
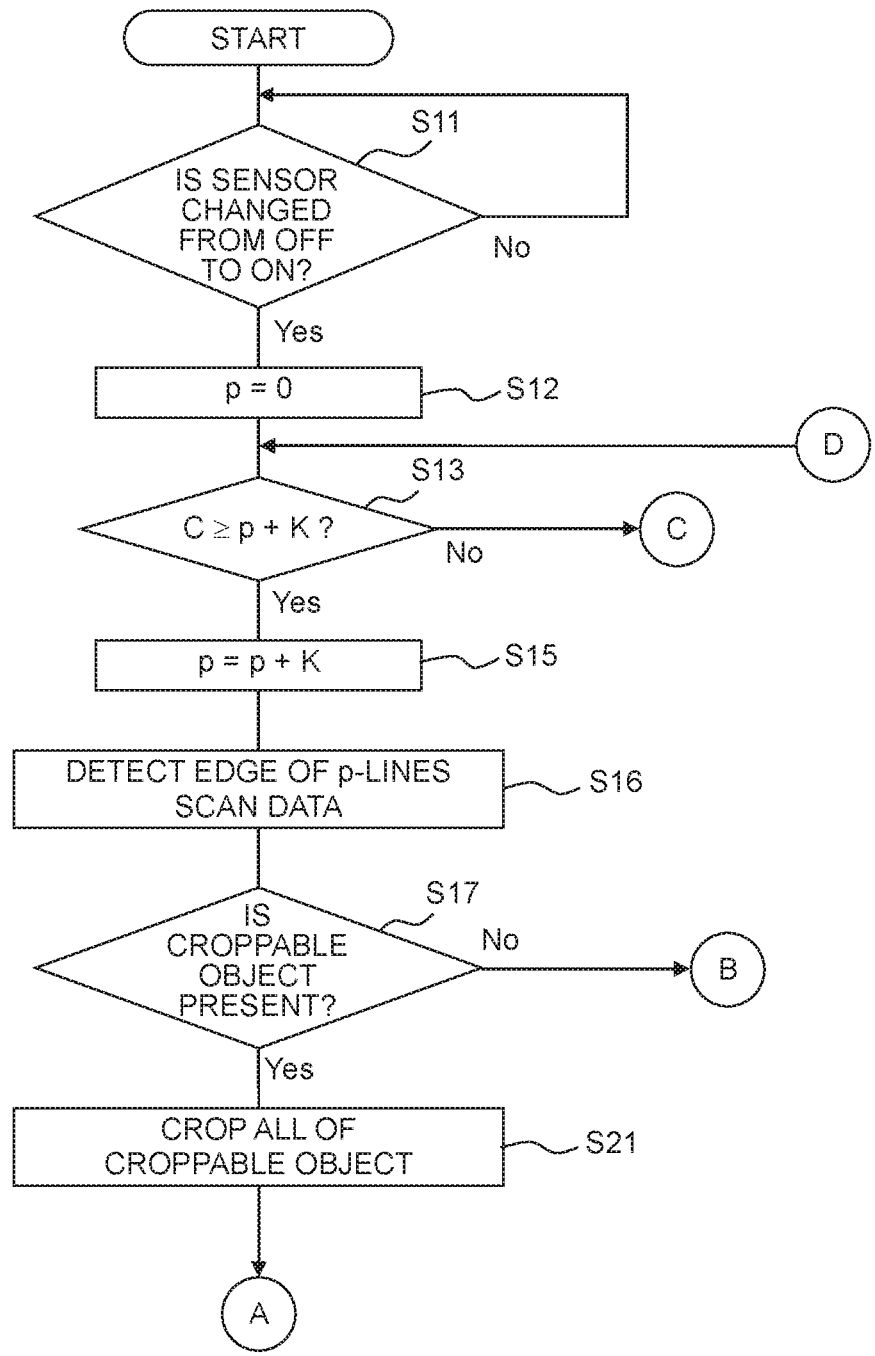
FIGS. 4A and 4B are a flowchart of a counted value correcting processing executed in the control system.
Figure 4B:
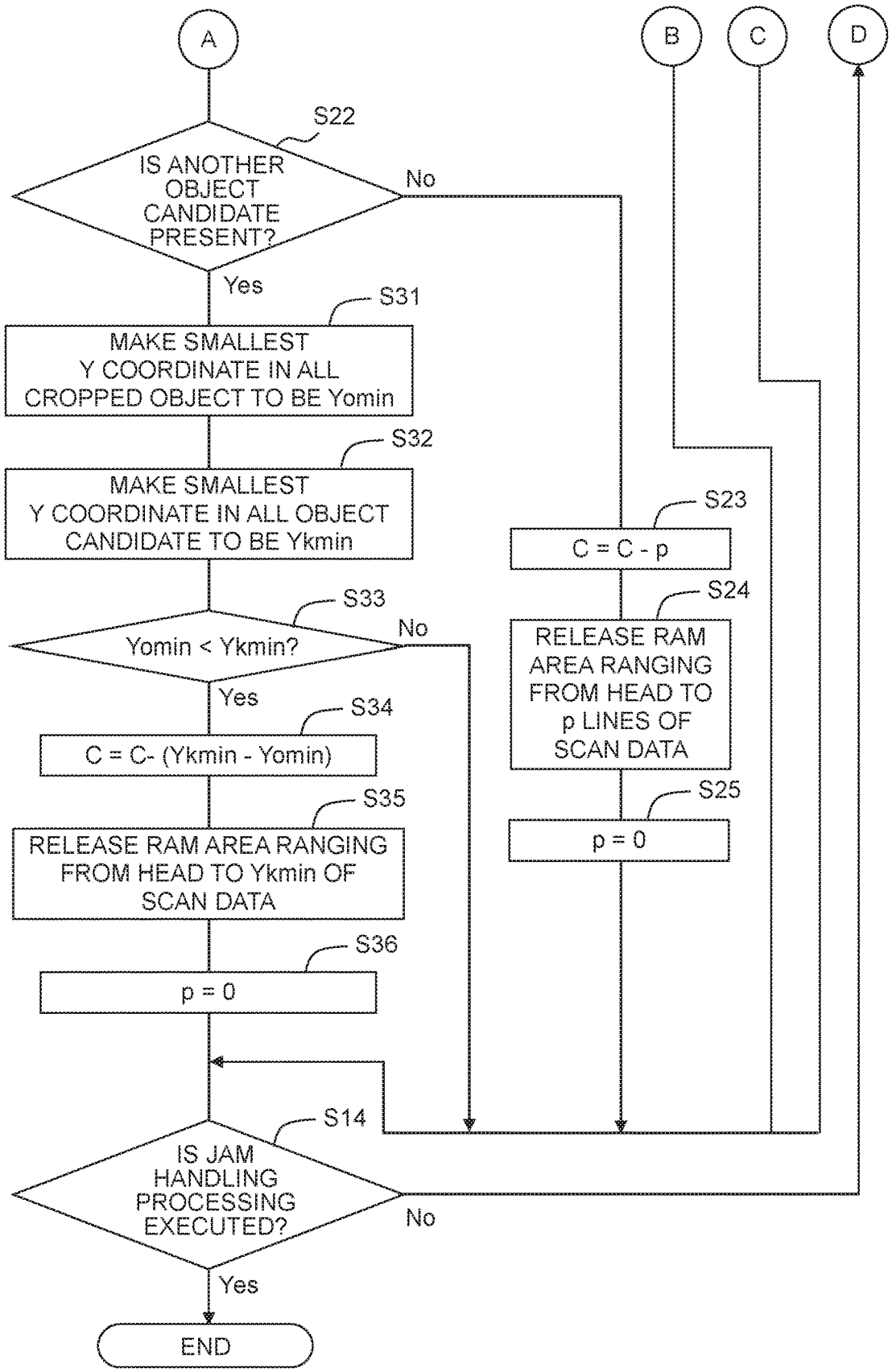

Furthermore, as depicted in FIG. 2, the image reading apparatus 1 is provided with a conveying motor 13 which drives the conveying rollers 5 and the conveying rollers 7, an interface (I/F) 15 which transmits scan data read by the CIS 9 to a communication line such as a LAN, etc., or to a recording medium such as a USB, etc., and a controller 20 which controls the above-listed parts or elements. The controller 20 is configured as a microcomputer provided with a CPU 21, a ROM 23, a RAM 25, a NVRAM 27, etc. In a case that a scan button (of which illustration in the drawings is omitted) is pressed or pushed, the CPU 21 of the controller 20 executes, in parallel, a counting processing as depicted in FIG. 3 and a counted value correcting processing as depicted in FIGS. 4A and 4B, based on a program stored in the ROM 23.

<Counting Processing>

Next, the counting process will be explained. In this processing, at first in step S1 (S represents "step": similarly in the following), the CPU 21 determines as to whether or not a state of (indicated by) a signal from the document detecting sensor 11 is changed from a state that the document G is not detected (namely, OFF) to a state that the document G is detected (namely, ON). In a case that the state of the signal from the document detecting sensor 11 is not changed from OFF to ON (step S1: No), the CPU 21 repeatedly performs the processing of step S1 and stands by. In a case that the signal from the document detecting sensor 11 is changed from OFF to ON (step S1: Yes), the CPU 21 performs the processing of step S2.

In step S2, an area, of the RAM 25, which is (allocated) for storing scan data is initialized. In a step S3 subsequent thereto, a counter C which counts the number of line(s) read by the CIS 9 is initialized to 0 (zero). In a step S4 subsequent thereto, 1 (one) is added to the counter C. Further, in step S5, scan data of (corresponding to) one line (one line-scan data) is obtained from the CIS 9 and written to the area of the RAM 25. Note that in the processing in step S5, by driving the conveyance motor 13 in accordance with a reading velocity of the CIS 9, a processing of conveying the original G in an amount or distance corresponding to one line, via the conveying rollers 5 and 7, is also performed. That is, in the present embodiment, in a case that the document G is inserted into the document insertion port 3A and is detected by the document detecting sensor 11 (step S1: Yes), an operation of conveying the document G in a conveyance direction as depicted in FIG. 1 while drawing (pulling) the document G into the inside of the document insertion port 3A is automatically started, and scan or scanning with respect to the original G is executed (step S5). Further, in a case that the scan is started, it is possible to insert a plurality of pieces of the document G, such as business cards, etc., consecutively (continuously) into the document insertion port 3A.

In step S6 subsequent to step S5, it is determined as to whether or not a value of the counter C becomes to be not less than a threshold value T for error determination. In a case that the value of the counter C is less than the threshold value T (step S6: No), the procedure or processing is proceeded to step S4 described above. In such a manner, a processing of reading the image of the document G by one line each and writing the image read by one line each to the RAM 25 (step S5), while counting (measuring), by the counter C, a number of lines read is repeated. Usually, before the value of the counter C reaches the threshold value T, the scan for one piece of the document G is completed (namely, the signal from the document detecting sensor 11 becomes to be OFF), and the counting processing is also ended.

However, in such a case that the state of conveyance of the document G by the conveying roller 5 or 7 becomes to be an empty conveyance state or in such a case that any jam (of the original G) occurs, the signal from the document detecting sensor 11 does not become to be OFF regardless of the amount or duration of time for which the conveying roller 5 or 7 are driven, which in turn makes the value of the counter C to be not less than the threshold value T. In such a case (step S6: Yes), a jam handling processing (JAM processing or JAM handling processing) for stopping the conveyance motor 13, etc., is executed in step S7, and then the counting processing is ended.

<Counted Value Correcting Processing>

Figure 5:
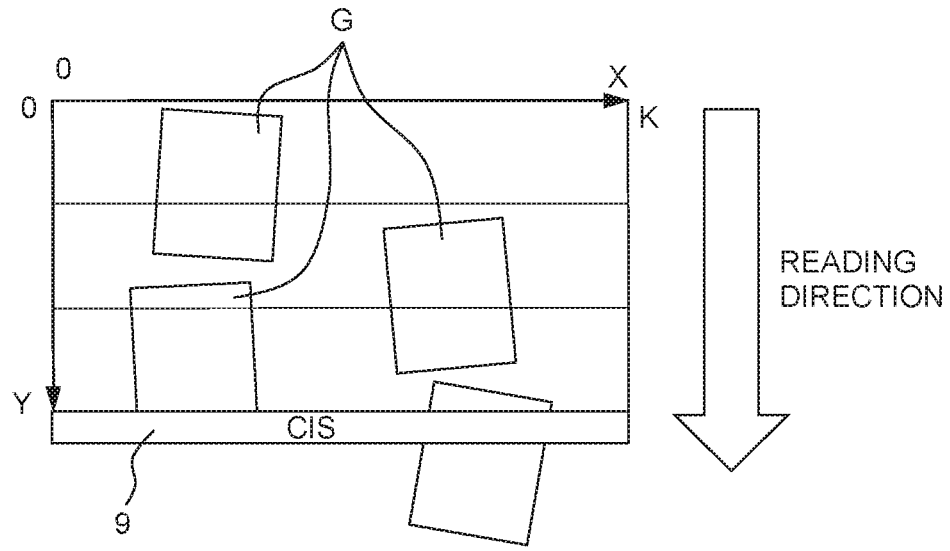
FIG. 5 is an explanatory view indicating, in a case that a plurality of documents are arranged side by side in a main scanning direction and are inserted, in an image forming apparatus of an embodiment, the positional relationship between each of the plurality of documents and a CIS (Contact Image Sensor).

Here, the document insertion port 3A has a width, for example, that allows a plurality of pieces of the document G such as a business card, etc., to be arranged in the main scanning direction and to be inserted into the document insertion port 3A. Accordingly, in such a situation, for example as depicted in FIG. 5, that a plurality of documents G are inserted into the document insertion port 3A, a state in which the signal from the document detecting sensor 11 does not become to be OFF is continued. Namely, the document detecting sensor 11 continuously detects the presence of at least one of the plurality of documents G. In such a case, under a condition that the value of the counter C is continuously added, the value of the counter C exceeds the threshold value T. In view of such a situation, the CPU 21 corrects the value of the counter C in a following manner by executing a counted value correcting processing as depicted in FIGS. 4A and 4B. Note that the following explanation will be made while presuming a coordinate system provided with a Y-coordinate which is increased along a reading direction of reading an image of the document G (namely, an opposite direction opposite to the conveyance direction) and a X-coordinate which is increased along the main scanning direction (for example, increased from a left end toward a right end of the X-coordinate), as depicted in FIG. 5. Note that the phrase a (the) "state (the document detecting sensor 11) continuously detects (the presence of at least one of the plurality of documents G)" in the present disclosure may also encompass such a case that a state of non-detection is momentarily provided due to, for example, effect of vibration, etc.

In the counted value correcting processing, the CPU 21 firstly determines whether the signal from the document detecting sensor 11 is changed from OFF to ON (step S11). In a case that the signal from the document detecting sensor 11 is not changed from OFF to ON (step S11: No), the CPU 21 repeatedly performs the processing of step S11 and stands by. In a case that the signal from the document detecting sensor 11 is changed from OFF to ON (step S11: Yes), the CPU 21 performs a processing of step S12.

In step S12, a variable p indicating an edge detection end position is initialized to 0 (zero). The term "edge" means an end edge of the document G (namely, each of sides constituting the outer periphery of the document G), and can be detected by a variety of known methods. In step S13 subsequent thereto, it is determined as to whether the value of the counter C is not less than "p+K". Note that "K" is an obtainment unit of the scan data (number of lines), and means that image analysis of the detecting of the edge, etc., is performed for K lines each (every K lines).

In a case that the sensor is changed from OFF to ON (step S11: Yes) and that the processing is proceeded to this step for the first time, this step is immediately after the processing in step S3. Therefore, the value of the counter C is set to a value which is less than K (step S13: No). Thus, the procedure is proceeded to step S14. In step S14, it is determined whether the jam handling processing is performed by step S7 described above. In a case that the jam handling processing is not performed (step S14: No), the procedure is proceeded to step S13 described above. In such a manner, in a case that the value of the counter C is increased by K (lines) by the counting processing as depicted in FIG. 3 (step S13: Yes), while the processings of S13 and S14 are repeated, the procedure is proceeded to S15.

In step S15, K is added to the variable p. Namely, the variable p corresponds to a predetermined conveyance amount which is increased sequentially by the K lines. In step S16 subsequent thereto, the edge is detected from scan data corresponding to p lines. Further, in step S17 subsequent thereto, it is determined, based on the result of detection of the edge by the processing in step S16, whether or not a croppable object (namely, a set of images which can be cut or crop as an image according to a single document G; an example of a "first set") is present in scan data corresponding to most-recent p lines. The croppable object can be defined in various manners. In the present embodiment, it is presumed that the original G is rectangular, and that a closed object constructed of four vertices (namely, intersections of edges) and four lines (namely, edges) (namely, the edges constructs closed curves) is referred to as a croppable object.

Figure 6:
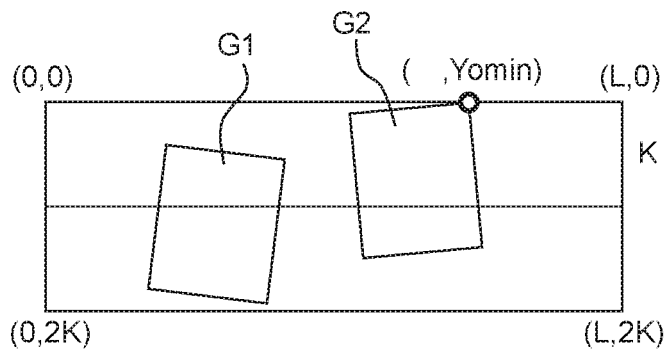
FIG. 6 is an explanatory view indicating the positional relationship between each of the plurality of documents and the CIS in a case that only a croppable object is present in an object range as an object or target of the counted value correcting processing.

For example, in an example depicted in FIG. 6, although there is no croppable object present at the time of reading first K lines from a line at which Y=0 (an Y=0 line), both originals G1 and G2 become to be croppable at the time of reading 2K lines from the Y=0 line. In view of this, in a case that it is determined that there is no croppable object in step S17 (S17: No), the procedure is proceeded to step S14 described above. In the example of FIG. 6, in a case that the procedure is proceeded to step S17 for the first time, since there is no croppable object (step S17: No), the procedure is proceeded to step S14. However, in a case that the procedures is proceeded to step S17, via the step S15 again (namely, after p=2K was provided), both the originals G1 and G2 become to be croppable (step S17: Yes). As a result of this, the procedure is proceeded to step S21.

Figure 7:
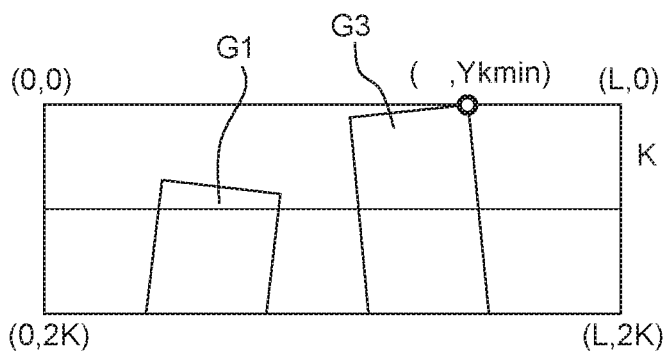
FIG. 7 is an explanatory view indicating the positional relationship between each of the plurality of documents and the CIS in a case that any croppable object is not present in the object range.

The CPU 21 crops, in step S21, all of croppable object(s). Namely, the CPU 21 cuts each of the croppable object(s) as an image according to a single document. The cropped image(s) may be outputted to a recording medium, etc., via the interface 15. In the example depicted in FIG. 6, images of the documents G1 and G2, respectively, in the scan data are each cut as an image according to a single document. In contrast, in an example depicted in FIG. 7, although the situation that p=2K is provided in step S15, there are no croppable objects are present in the scan data of the most-recent p lines (step S17: No). Accordingly, the procedure is proceeded from step S17 to step S14.

In a case that a croppable object is cropped in step S21, then in step S22 subsequent thereto, it is determined as to whether there is any other object candidate(s) are present in the scan data corresponding to the most-recent p lines. The term "object candidate" means a set of images which can be considered as a part on a downstream side in the conveyance direction of the set of images which can be cut or cropped as the image according to the single document G (namely, an example of a "second set"). Although the object candidate can be defined in various manners, the object candidate is defined in the present embodiment as being a continuous line composed of one vertex and two lines.

As in the example depicted in FIG. 6, in a case that there is no object candidate other than the croppable object (step S22: No), the procedure is proceeded to step S23. In step S23, the value of the variable p is subtracted from the value of the counter C (namely, a conveyance amount indicated by the value of the counter C is subjected to subtraction correction by the value of the variable p), and the procedure is proceeded to step S24. In step S24, an area, of RAM25, with respect to the data corresponding to the p lines from the top (head) of the scan data stored in the RAM 25 at that time is released.

In step S25 subsequent to step S24, the variable p is initialized to 0 (zero), and the procedure is proceeded to step S14 described above. In a case that the jam handling processing is not performed in step S14 (step S14: No), the procedure is proceeded to step S13. Then, every time scan data corresponding to K lines is newly obtained (step S13: Yes), the determination as to the presence or absence of the croppable object(s) as described above (namely, the image analysis), etc., is executed.

In a case that it is determined in step S22 that there is other object candidate(s) in step S22 (step S22: Yes), the procedure is proceeded to step S31. In step S31, a smallest Y coordinate (Yomin) for all of the object(s) cropped in step S21 is obtained. In step S32 subsequent thereto, the smallest Y coordinate (Ykmin) in all of the object candidate(s) is obtained. Note that a vertex, in a croppable object, at which the Y-coordinates is the Yomin corresponds to a first end, and a vertex Y, in the candidate object, at which the Y-coordinates is the Ykmin corresponds to a second end. In step S33 further subsequent thereto, it is determined as to whether Yomin is smaller than Ykmin. In a case that Yomin<Ykmin (step S33: Yes), then in step S34, a value corresponding to (Ykmin-Yomin) is subtracted from the value of the counter C (namely, the conveyance amount indicated by the value of the counter C is subjected to subtraction correction by the value of (Ykmin-Yomin)). Then, in step S35, an area, of RAM25, corresponding to data in a range from the top (head) and up to Ykmin of the scan data stored in the RAM 25 at that time, is released.

Figure 8:
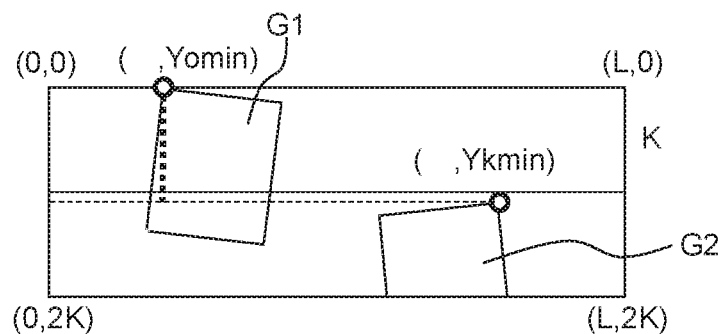
FIG. 8 is an explanatory view indicating the positional relationship between each of the plurality of documents and the CIS in a case that a croppable object and an object candidate are present in the object range.

For example, in an example depicted in FIG. 8, a document G1 is croppable, and a document G2 is an object candidate. Further, Y-coordinate Yomin of the vertex on the downstream-most side in the conveyance direction in the document G1 is smaller than (namely, is located on the downstream side in the conveyance direction of) Y-coordinate Ykmin of the vertex on the downstream-most side in the conveyance direction in the document G2 (step S33: Yes). In this case, under a condition that the image of the document G1 is cropped in step S21, there is no need to store the scan data from the top up to Ykmin in the RAM25. Therefore, the area, of the RAM25, storing the above-described data is released in step S35. Further, in this case, the value of the counter C indicating the conveyance amount of the document(s) with the number of line(s) is also subjected to subtraction by the value corresponding to (Ykmin-Yomin) in step S34. By doing so, the conveyance amount of the document(s) is counted (measured) from the Y-coordinate "Ykmin", in the document G2, which is located at the downstream-most side in the conveyance direction.

In step S36 subsequent to steps S34 and 35, the variable p is initialized to 0 (zero), and the procedure is proceeded to step S14 described above. In a case that the jam handling processing is not performed in step S14 (step S14: No), the procedure is proceeded to step S13. Then, every time scan data corresponding to K lines is newly obtained (step S13: Yes), the determination as to the presence or absence of the croppable object(s) as described above, etc., is executed.

Figure 9:
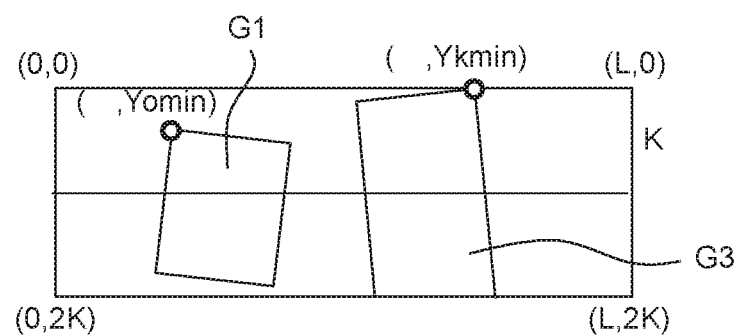
FIG. 9 is an explanatory view indicating the positional relationship between each of the plurality of documents and the CIS, in another example, in a case that a croppable object and an object candidate are present in the object range.

In an example depicted in FIG. 9, a document G1 is croppable, and a long or elongated document G3 is an object candidate. Further, Y-coordinate Yomin of the vertex on the downstream-most side in the conveyance direction in the document G1 is greater than Y-coordinate Ykmin of the vertex on the downstream-most side in the conveyance direction in the document G3. Namely, the object candidate is conveyed prior to or ahead of the croppable object (step S33: No). In this case, since there is no releasable area in the RAM 25, the procedure is proceeded to step S13 via step S14 described above. Further, every time scan data corresponding to K lines is newly obtained (step S13: Yes), the determination as to the presence or absence of the croppable object(s) as described above, etc., is executed. By this processing, for example in the example depicted in FIG. 9, there arises such a possibility that the long document G3 as the object candidate might also be cropped.

[Effects]

The above-described embodiment achieves the following effects. In the above-described embodiment, even in a case that a plurality of documents G are inserted into the document insertion port 3A and that there is a croppable object is present in the read image, a value according to the length of the sub-scanning direction in the object is subtracted from the value of the counter C as the counted or measured value of the conveyance amount. Therefore, even in a case that the plurality of documents G are inserted into the document insertion port 3A, it is possible to suppress such a situation that the length of one document (i.e., the value of the counter C) might be determined to be not less than the threshold T and that the jam handling processing might be executed. Note that in the above-described embodiment, the value according to the length in the sub-scanning direction of the croppable object is p or (Ykmin-Yomin).

In the above-described embodiment, every time the value of the counter C as the conveyance amount of the document(s) reaches the variable p as the predetermined conveyance amount which is increased by K lines, an image read by the CIS 9 in a case that the document(s) is (are) conveyed only by the p lines is read (i.e. analyzed), and the presence or absence of the croppable object(s) is determined. Namely, the above-described determination is made every time the document(s) G is (are) conveyed by K lines. Therefore, it is possible to perform the determination as to whether the croppable object(s) is present, at an appropriate frequency.

A reading range including only a croppable object(s), namely only an image cuttable as an image according to a single document G, is a range which can be ignored in a case that, after the croppable object is cropped, the length of the document is counted or measured by the counter C. In view of this, in a case that a croppable object is present and that any object candidate is not present (S22: No), the present embodiment subtracts the variable p as the predetermined conveyance amount from the value of the counter C as the counted conveyance amount (step S23). Therefore, it is possible to count the conveyance amount of the single document counted by the counter C (namely, the length of the document) more appropriately.

In a case that Yomin<Ykmin (step S33: Yes), a reading range between Y coordinate which is Yomin and the Y coordinate which is Ykmin (for example, a range indicated by a bold broken line in FIG. 8) includes only a croppable object. Therefore, this reading range is a range which can be ignored in a case that, after the croppable object is cropped, the length of the document is counted or measured by the counter C. Therefore, in a case that Yomin<Ykmin (step S33: Yes), the present embodiment subtracts (Ykmin-Yomin), namely the distance in the sub-scanning direction from the first end to the second end, from the value of the counter C as the counted conveyance amount. Accordingly, it is possible to count or measure the conveyance amount of a single document counted by the counter C (namely, the length of the document) more appropriately.

In a case that Yomin Ykmin (step S33: No), an object candidate is present in the reading range between the Y-coordinate which is Yomin and the Y-coordinate which is Ykmin. Therefore, this reading range is a range which cannot be ignored in a case that the length of the document is counted or measured. In view of this, in the case that Yomin Ykmin (step S33: No), the present embodiment does not subject the value of the counter C to the subtraction correction. Accordingly, it is possible to count or measure the (single) conveyance amount of a single document counted by the counter C (namely, the length of the document) more appropriately.

In the present embodiment, the counting processing, as depicted in FIG. 3, of performing addition of the value of the counter C while executing the reading, and the counted value correcting processing, as depicted in FIGS. 4A and 4B, of correcting the value of the counter C by determining the presence or absence of croppable object(s) by the image analysis, etc., are executed as parallel processings. Accordingly, as compared with a case of repeating the processing of performing the image analysis after performing the reading for the K lines, it is possible to increase the speed of the processing as a whole. Further, by using the variable p for the counted value correcting processing, rather than using the value of the counter C directly for the counted value correcting processing, it is possible to increase the object or target range for the analysis in step S16 by every K line(s) even in a case that the counting processing and the counted value correcting processing are not synchronized.

OTHER EMBODIMENTS

In the foregoing, although the embodiment of the present disclosure has been explained, the present disclosure is not limited to the above embodiment, and can be modified in various manners.

In the embodiment, the processings of step S23 and S34 are performed to thereby correct the value of the counter C in both the cases exemplified in FIG. 6 and FIG. 8, respectively. The aspect of correcting the value of the counter C is, however, not limited to this. For example, it is allowable that either one of the processings of step S23 and S34 is performed to thereby correct the value of the counter C at either one of the cases exemplified in FIG. 6 and FIG. 8, respectively.

In the above-described embodiment, although the present disclosure is applied to a so-called mobile scanner which outputs obtained scan data to a recording medium, etc., the present disclosure is applicable also to a copying apparatus which executes printing in accordance with the scan data and a facsimile apparatus which transmits the scan data via a communication line.

In the above-described embodiment, although the document G is presumed to be rectangular, the present disclosure is applicable also to such a case that the document G is one of a variety of shapes including a star-shaped, disc-shaped, etc. In such a case, it might be desired, in some cases, to change the definition of the croppable object and the definition of the object candidate.

A plurality of functions possessed by one component in the above-described embodiment may be realized by a plurality of components, and one function possessed by one component in the above-described embodiment may be realized by a plurality of components. Further, a plurality of functions possessed by a plurality of components in the above-described embodiment may be realized by one component, and one function realized by a plurality of components in the above-described embodiment may be realized by one component. Furthermore, a part of the configuration of the above-described embodiment may be omitted. Moreover, at least a part of the configuration of the above-described embodiment may be added to, or be replaced by, the configuration of other embodiments.

In addition to the image reading apparatus as described above, the present disclosure may be realized as, for example, a system having the image reading apparatus as a constituent component thereof, a program for causing a computer to function as the image reading apparatus, a non-transient actual recording medium such as a semiconductor memory having the program recorded thereon, an image reading method, etc.

What is claimed is:

1. An image reading apparatus comprising:
a document insertion port configured to allow a plurality of documents to be inserted thereinto in a state that the documents are arranged side by side in a main scanning direction;
a conveyor configured to convey the documents inserted into the document insertion port in a predetermined conveyance direction while drawing the documents into the document insertion port;
a scanner configured to read a plurality of images of the documents conveyed by the conveyor;
a detector configured to detect whether at least one of the documents is present in the document insertion port; and
a controller configured to count a conveyance amount by which the documents are conveyed by the conveyor during a period in which the detector continuously detects that the at least one of the documents is present in the document insertion port,
wherein in a case that the images read by the scanner include a set of images croppable as an image of a single document included in the documents, the controller is configured to correct the conveyance amount by subtracting a value corresponding to a length in the conveyance direction of the set of images from the conveyance amount.

2. The image reading apparatus according to claim 1, wherein every time the conveyance amount reaches a predetermined conveyance amount, the controller is configured to analyze the images read by the scanner during a period in which the documents are conveyed by the predetermined conveyance amount, and determine whether the set of images croppable as the image of the single document is included in the images read by the scanner.

3. The image reading apparatus according to claim 2, wherein in a case that a first set is included in the images read by the scanner and a second set is not included in the images read by the scanner, the controller is configured to correct the conveyance amount by subtracting the predetermined conveyance amount from the conveyance amount, the first set being the set of images croppable as the image of the single document, the second set being a part on a downstream side in the conveyance direction of another set of images croppable as another image of another document.

4. The image reading apparatus according to claim 2, wherein in a case that a first set and a second set are included in the images read by the scanner and that a second end of the second set is located on an upstream side in the conveyance direction of a first end of the first set, the controller is configured to correct the conveyance amount by subtracting a distance in the conveyance direction from the first end to the second end from the conveyance amount, the first set being the set of images croppable as the image of the single document, the second set being a part on a downstream side in the conveyance direction of another set of images croppable as another image of another document, the first end being an end on the downstream side in the conveyance direction of the first set, and the second end being an end on the downstream side in the conveyance direction of the second set.

5. The image reading apparatus according to claim 2, wherein in a case that a first set and a second set are included in the images read by the scanner and that a second end of the second set is located on a downstream side in the conveyance direction of a first end of the first set, the controller is configured not to correct the conveyance amount, the first set being the set of images croppable as the image of the single document, the second set being a part on the downstream side in the conveyance direction of another set of images croppable as another image of another document, the first end being an end on the downstream side in the conveyance direction of the first set, and the second end being an end on the downstream side in the conveyance direction of the second set.

* * * * *